(12) United States Patent
Jarvis et al.

(10) Patent No.: US 7,310,286 B1
(45) Date of Patent: Dec. 18, 2007

(54) SYSTEM FOR UNDERSEA DIGITAL ACOUSTIC COMMUNICATIONS

(75) Inventors: Susan M. Jarvis, Westport, MA (US); Fletcher A. Blackmon, Forestdale, MA (US); Ronald R. Morrissey, Randolph, MA (US); Nixon Pendergrass, Nashville, IN (US); Dean J. Smith, Dover-Foxcroft, ME (US); Kevin C. Fitzpatrick, Suwanee, GA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 185 days.

(21) Appl. No.: 11/183,308

(22) Filed: Jul. 11, 2005

(51) Int. Cl.
*H04B 11/00* (2006.01)

(52) U.S. Cl. ...................................... 367/134; 340/850

(58) Field of Classification Search ................. 367/134; 340/850
See application file for complete search history.

(56) References Cited

U.S. PATENT DOCUMENTS

| | | | |
|---|---|---|---|
| 4,563,758 A | 1/1986 | Paternostro | |
| 5,018,114 A | 5/1991 | Mackelburg et al. | |
| 5,303,207 A | 4/1994 | Brady et al. | |
| 5,469,403 A | 11/1995 | Young et al. | |
| 5,523,982 A | 6/1996 | Dole | |
| 6,058,071 A | 5/2000 | Woodall et al. | |
| 6,125,080 A * | 9/2000 | Sonnenschein et al. ..... | 367/134 |

\* cited by examiner

*Primary Examiner*—Ian J. Lobo
(74) *Attorney, Agent, or Firm*—James M. Kasischke; Jean-Paul A. Nasser; Michael P. Stanley (57) ABSTRACT

An undersea communications system in which a message is converted to a redundant fixed-length data packet and transmitted acoustically as a quadrature phase-keyed signal in a frequency band with a continuous pilot signal at a frequency closely adjacent to the frequency band. A receiver uses the received continuous pilot signal to Doppler compensate the incoming quadrature phase keyed signal by estimating any Doppler distortion in the received pilot signal. The resultant redundant signals are then robustly processed coherently and jointly by the adaptive decision feedback equalizer and decoder to provide the original transmitted data.

10 Claims, 8 Drawing Sheets

SYSTEM FOR UNDERSEA DIGITAL ACOUSTIC COMMUNICATIONS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention generally relates to bi-directional communication systems and more specifically to communication systems capable of conducting bi-directional communications in an undersea environment.

(2) Description of the Prior Art

Acoustic communications in undersea applications are subject to multi-path effects in the water. Multi-path effects are produced by acoustic propagations from a transmission point that travel either directly to an underwater receiver or may reflect from the ocean surface and ocean floor or even areas of different temperature and density to create cancellation and distortion of the directly propagated transmission. Some suggest that these multi-path effects can be overcome by the transmission of data over a number of different transmission frequencies. This improves the chances of clear communications as one or more of the transmitted signals may ultimately be received without severe multi-path distortion. However, such systems tend to be complex and difficult to implement. They also make certain assumptions about transmissions that may not be accurate in an actual operating environment.

There are a number of other approaches for undersea acoustic communications that vary with different applications. United States Letters Patent No. 4,563,758 (1986) to Paternostor discloses an underwater communicator device that permits acoustic communications between divers by using a voice synthesizer and an acoustic transducer. A display is provided to visually communicate a message. The diver can communicate stored messages by activating a single key or by keying in an actual message. Other preset messages can also be sent based on different sensors.

U.S. Pat. No. 5,018,114 to Mackelburg et al. (1991) discloses another type of acoustic communication system in which an operator has adjustable frequency diversity so data rates can be tailored to specific multi-path environments. Transmitted messages are sent with precursor transmission/reception synchronization data and transmission parameter data so the receiving communication end can recognize when message data starts by means of tone length as well as frequency diversity in the transmitted message. Timing is extracted from the data to compensate for Doppler shift.

U.S. Pat. No. 5,303,207 to Brady et al. (1994) discloses an acoustic local area network for oceanographic observation and data acquisition. A network node has telemetry equipment for transporting data to a final destination. Each of a plurality of sensors has an acoustic modem to transmit information to the network node. Transmissions are in the form of BPSK input signals. The data channels occupy a bandwidth of about 5-10 kHz while control channels occupy a frequency bandwidth of about 1 KHz.

U.S. Pat. No. 5,523,982 to Dale (1996) discloses communication apparatus for diver-to-diver communications. This system uses ultra-acoustic transmission means and reception means. When the transmission means is activated, a predetermined signal is transmitted that is suitable by reception at another diver's apparatus.

U.S. Pat. No. 5,469,403 to Young et al. (1995) discloses a digital sonar system that identifies multi-frequency underwater activating sonar signals received from a remote sonar transmitter. A transponder includes a transducer that receives acoustic waves, including the activating sonar signal, and generates an analog electrical receipt signal. This signal converts to a digital receipt signal that is cross-correlated with a digital transmission signal pattern corresponding to the activating sonar signal. A relative peak in the cross correlation value is indicative of the activating sonar having been received by the transponder. In response to identifying the activating sonar signal, the transponder transmits a responding multi-frequency sonar signal.

U.S. Pat. No. 6,058,071 to Woodall et al. (2000) discloses a magneto-inductive submarine communications systems and buoy to provide two-way signal communication between a submerged craft, such as a submarine, and a remote command station that may be airborne, on the surface or on land. A buoy released from the submarine and floating on the surface of the ocean and a satellite are included to complete bi-directional communications. Messages and commands between the submerged craft and the buoy are communicated by magneto-inductive messages signals and magneto-inductive command signals in an extremely low frequency to very low frequency ranges. Messaging command communications between the buoy and the satellite to the station are transferred via radio frequency signals or laser emissions.

Each of the foregoing techniques provides some method of undersea communication, but not a system that provides reliable undersea communications. United States Letters Patent Nos. 5,469,403 and 5,303,207 disclose bi-directional acoustic systems, however they do not use incoherent signal processing. What is needed is a system that provides reliable undersea communications at reasonable data rates

SUMMARY OF THE INVENTION

Therefore it is an object of this invention to provide an acoustic bi-directional undersea communication system.

Another object of this invention is to provide an acoustic bi-directional undersea communication system that overcomes many of the problems of multi-path effects.

Still another object of this invention is to provide an acoustic undersea bi-directional communication system that provides high telemetry rates.

Yet still another object of this invention is to provide an acoustic undersea bi-directional communications system that provides reliable communications in both deep water and shallow water environments.

In accordance with one aspect of this invention an undersea communications system includes a transmitter at a transmitting location and a receiver at a receiving location. The transmitter includes a transmitting module for transmitting as an output signal a modulated signal in a given frequency band and for generating a continuous wave pilot signal having a frequency adjacent said given frequency band. The receiver includes a receiver for processing the pilot signal, a demodulator, a cross correlator that processes the received pilot signal and modulated signal to produce a cross-correlated demodulated signal. A decoder converts the cross correlated demodulated signal into a received message signal.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
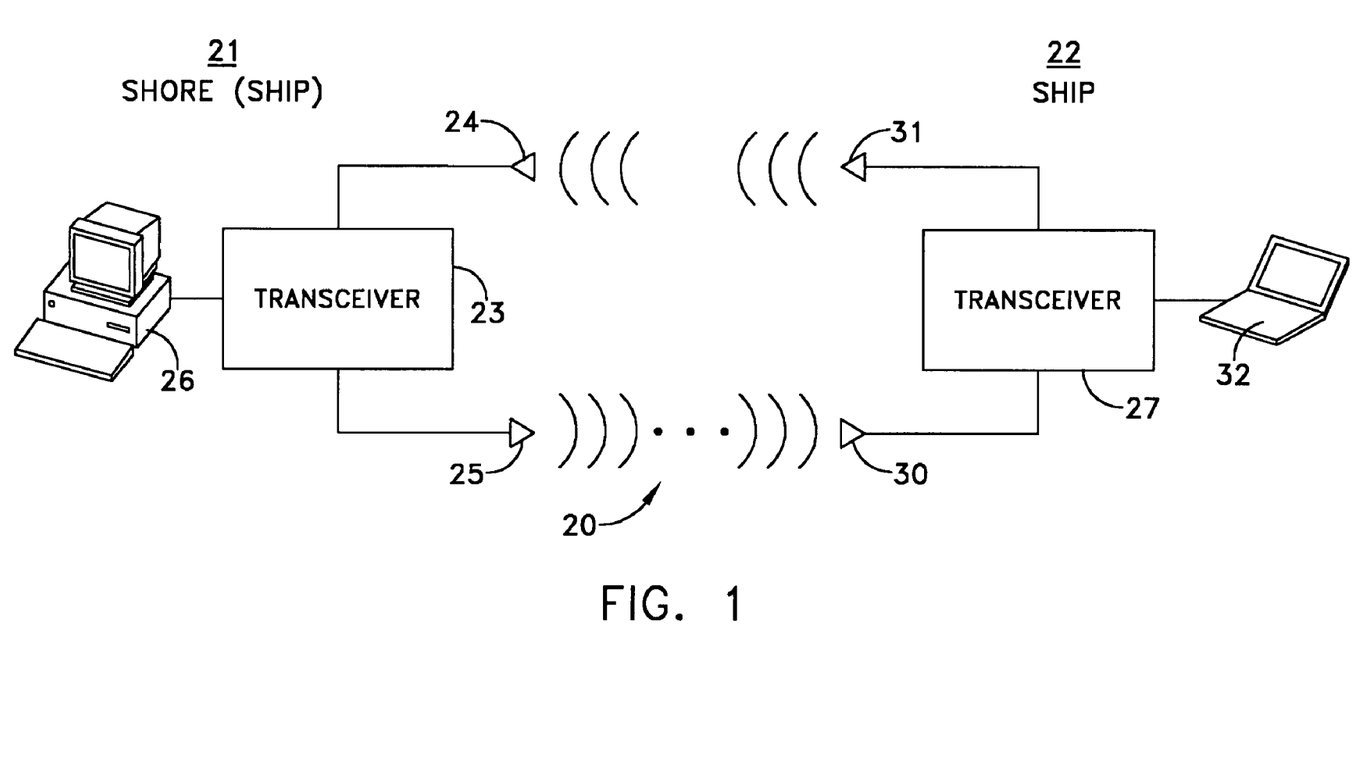
FIG. 1 depicts a land-based site and an undersea-based site adapted for using this invention.

FIG. 1 depicts a communications system 20 constructed in accordance with this invention that establishes communications between two sites 21 and 22. Site 21 typically is a shore site, although it can be an offshore site as on a surface or other ship. Site 22 is a ship site, typically at a submarine or other undersea vehicle.

In this specific embodiment the shore site 21 includes a transceiver 23 that receives inputs from a receiving acoustic transducer 24 and that transmits acoustic signals from a transmitting acoustic transducer 25. The transceiver 23 is computer-based and transmits signals in response to messages input at a terminal 26 and displays messages on that same terminal 26.

Site 22 has a similar organization with a transceiver 27 that receives signals from a receiving acoustic transducer 30 and transmits signals from a transmitting acoustic transducer 31. A terminal 32 serves as an input device for messages to be transmitted and a display for received messages.

Incorporating transceivers, such as the transceivers 23 and 27 at each of two sites along with separate transmitting and receiving acoustic transducers enables bi-directional or full duplex communications. It will be apparent to those of ordinary skill in the art that the system 20 in FIG. 1 is also adapted to provide uni-directional or half-duplex communications.

Figure 2:
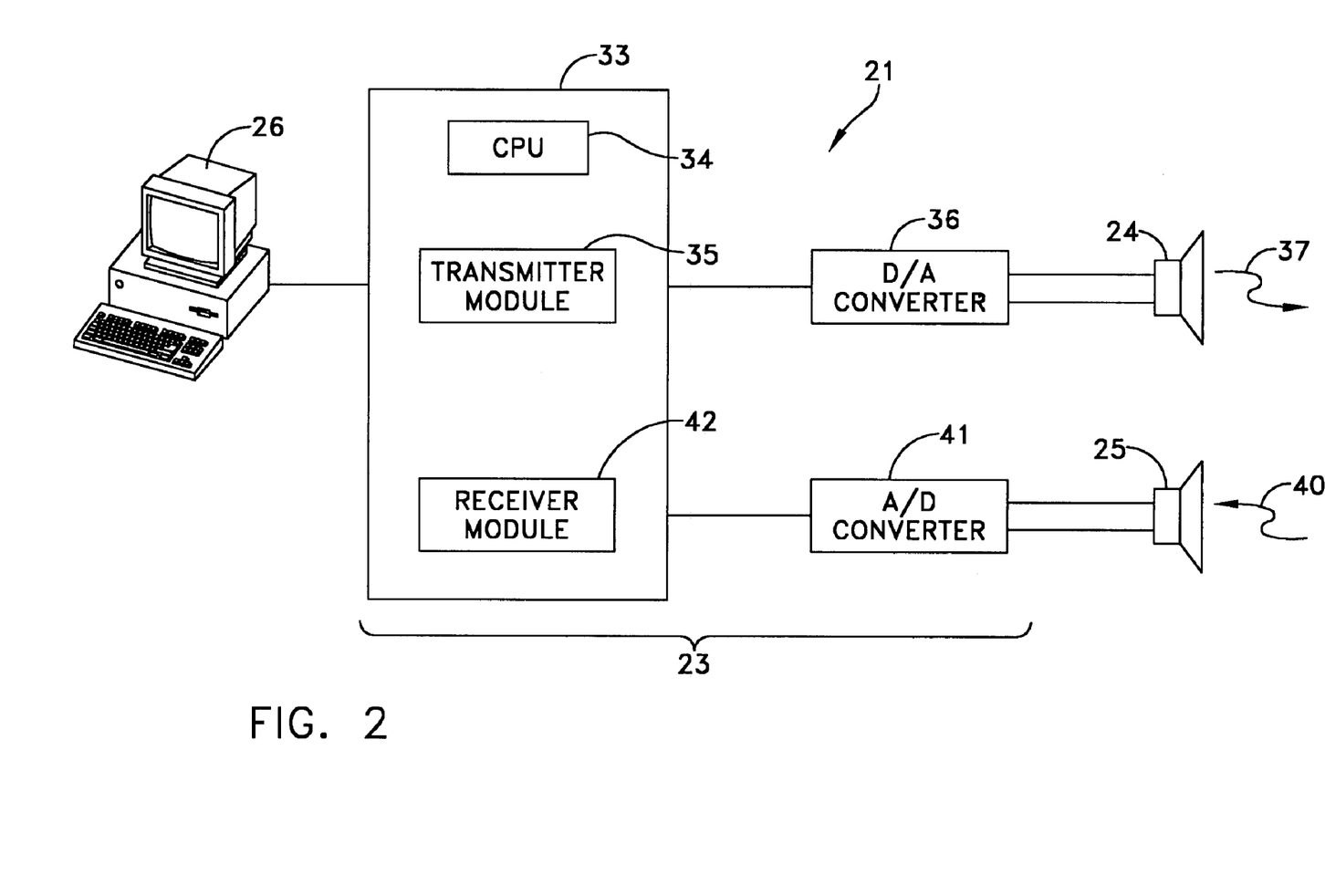
FIG. 2 is a block system diagram that depicts various modules and components for forming a communications system located at each site shown in FIG. 1 that incorporates this invention.

Each site has the same basic construction so FIG. 2 depicts SITE 21 as a representative site in which the transceiver 23 comprises a CPU-based modem 33 with a CPU 34 that interfaces with a source of transmitted messages, such as the terminal 26. A transmitter module 35 responds to messages from the terminal 26 by encoding the data for transmission to a digital to analog (D/A) converter 36. The converter 36 generates an output from the transmitting acoustic transducer 24 in the form of a transmitted radiated signal 37.

For full duplex operations the receiving acoustic transducer 25 receives signals 40 in an analog form for transfer to an analog-to-digital (A/D) converter 41. The A/D converter 41 generates signals that are compatible with a receiver module 42 that, with the CPU 34, provides decoding and message display at the terminal 26.

Thus, messages generated at the keyboard of terminal, such terminal 26, are encoded and transmitted as the signals 37. Incoming signals 40 are converted and displayed on a display unit with the terminal 26. The specific handling of the incoming messages at either terminal 26 or 32 is not important to this invention and could take any of several known implementations.

Figure 3:
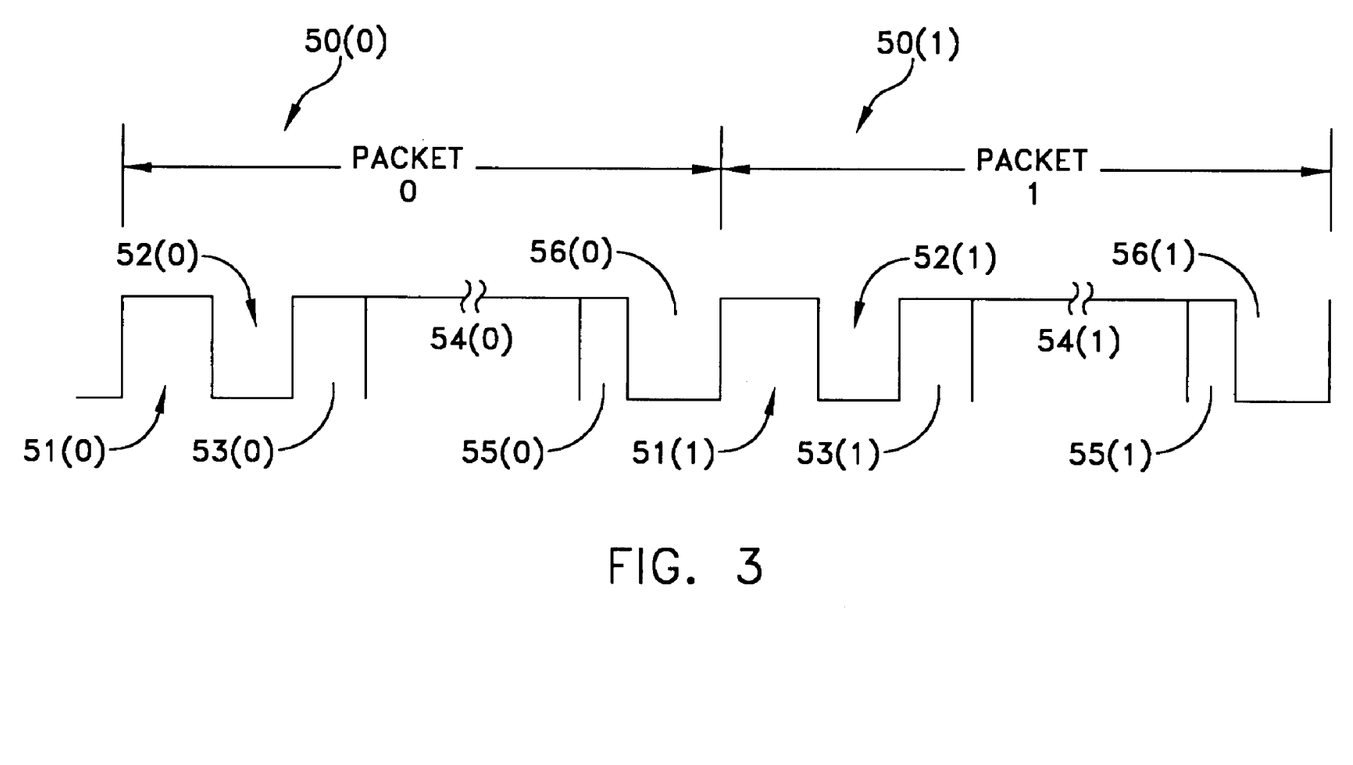
FIG. 3 is a diagram that depicts data packets useful in this invention.

In one embodiment of this invention, a data message is encoded into a pair of redundant, fixed-length data packets, such as shown in FIG. 3 as PACKET 0 and PACKET 1. In FIG. 3 like reference numerals refer to like portions of the message with a suffix "0" for PACKET 0 and "1" for PACKET 1. Thus FIG. 3 depicts PACKET 0 as packet 50(0) and PACKET 1 as packet 50(1).

Each packet includes a leading synchronizing signal or pulse 51(0) or 51(1) that could be a phase shift keyed (PSK) target identification signal. The duration and form of the synchronizing pulse can be varied and generally will be determined by outside characteristics that form no part of this invention.

Dead time intervals 52(0) and 52(1) follow the synchronizing pulses 51(0) or 51(1). Each dead time interval allows any reverberation to dissipate before data is sent.

Next the packet includes a quadrature phase shift key (QPSK)or like modulated data block that includes a sequence of symbols, like characters, organized as training symbols 53(0) and 53(1), data symbols 54(0) and 54(1) and padding symbols 55(0) and 55(1). In one specific embodiment each data packet has 200 training symbols. The balance comprises 1800 symbols with a symbol duration of 400 microseconds and a QPSK modulating signal of 5 kHz. Of these 1800 symbols, the padding symbols 55(0) and 55(1) provide a full number of data bytes even though the actual message may require fewer symbols.

Figure 4:
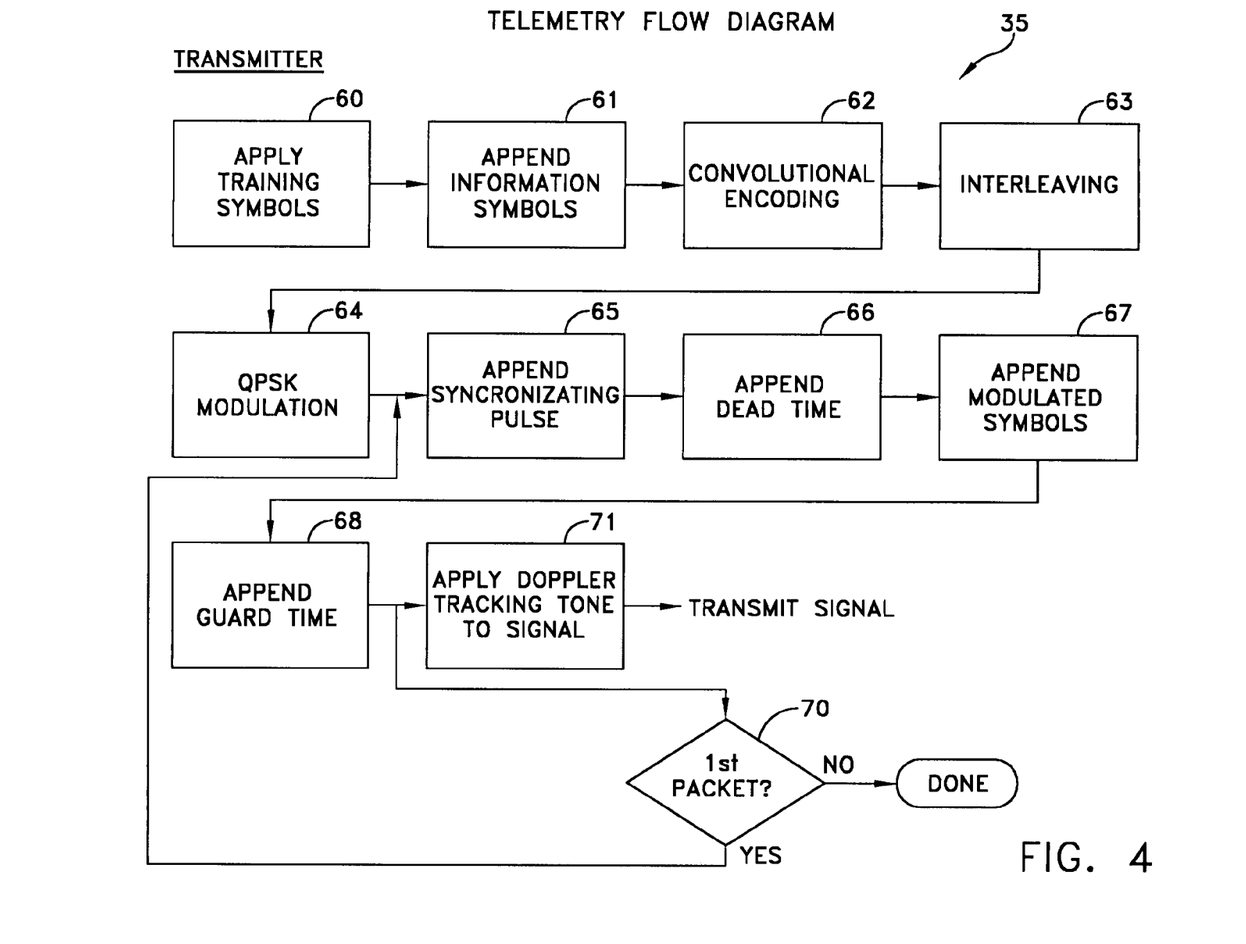
FIG. 4 is a block diagram of a transmitter module useful in this invention.

Now referring to FIG. 4, initially the transmitter module 35, also shown in FIG. 2, begins to form the data packets by generating the training symbols in step 60 and the data, or information, symbols including the padding symbols in step 61. Steps 62 and 63 represent optional convolutional encoding and interleaving processes 62 and 63. As one example, step 62 can be implemented by means of a convolutional encoder with a constraint length of 6 or higher and a coding factor of 2 or higher for providing error correction. Block coding and trellis coded modulated processes are examples of alternatives to the convolutional encoding process. Interleaving step 63 provides a means for combating any burst errors. During interleaving, a bit pattern is deterministically scrambled for transmission. If a burst of errors occurs during the transmission of the interleaved packet, errors will be distributed across the packet when the receive packet is de-interleaved. This increases the likelihood that a convolutional decoder can correct the bits in error.

Once these steps are complete, step 64 represents a process by which the CPU 34 in FIG. 2 modulates the corresponding bit stream by quadrature pulse shift keyed (QPSK) modulation. Step 65 provides the initial synchronizing pulses or pulse, such as synchronizing signals 51(0) and 51(1). Step 66 appends the dead times represented by pulses 52(0) and 52(1) in FIG. 3. Then the modulated bit stream including the training symbols 53(0) and 53(1), the data symbols 54(0) and 54(1) and padding symbols 55(0) and 55(1) are appended. A guard time is then added in step 68.

After the first data packet 50(0) is processed, step 70 returns control to step 65 to transmit data packet 50(1).

Step 71 represents the simultaneous transmission of a continuous wave (CW) pilot signal at a frequency that is at the edge of the QPSK signal band. As described later, a receiver module, such as the receiver module 42 in FIG. 2, uses this tone to estimate Doppler shift in the received signal.

The transmitted signal from the transmitter module 35 is in digital form. The D/A converter 36 in FIG. 2 then transmits a corresponding analog signal to the transducer 24 to produce the radiated acoustic signal 37.

Figure 5:
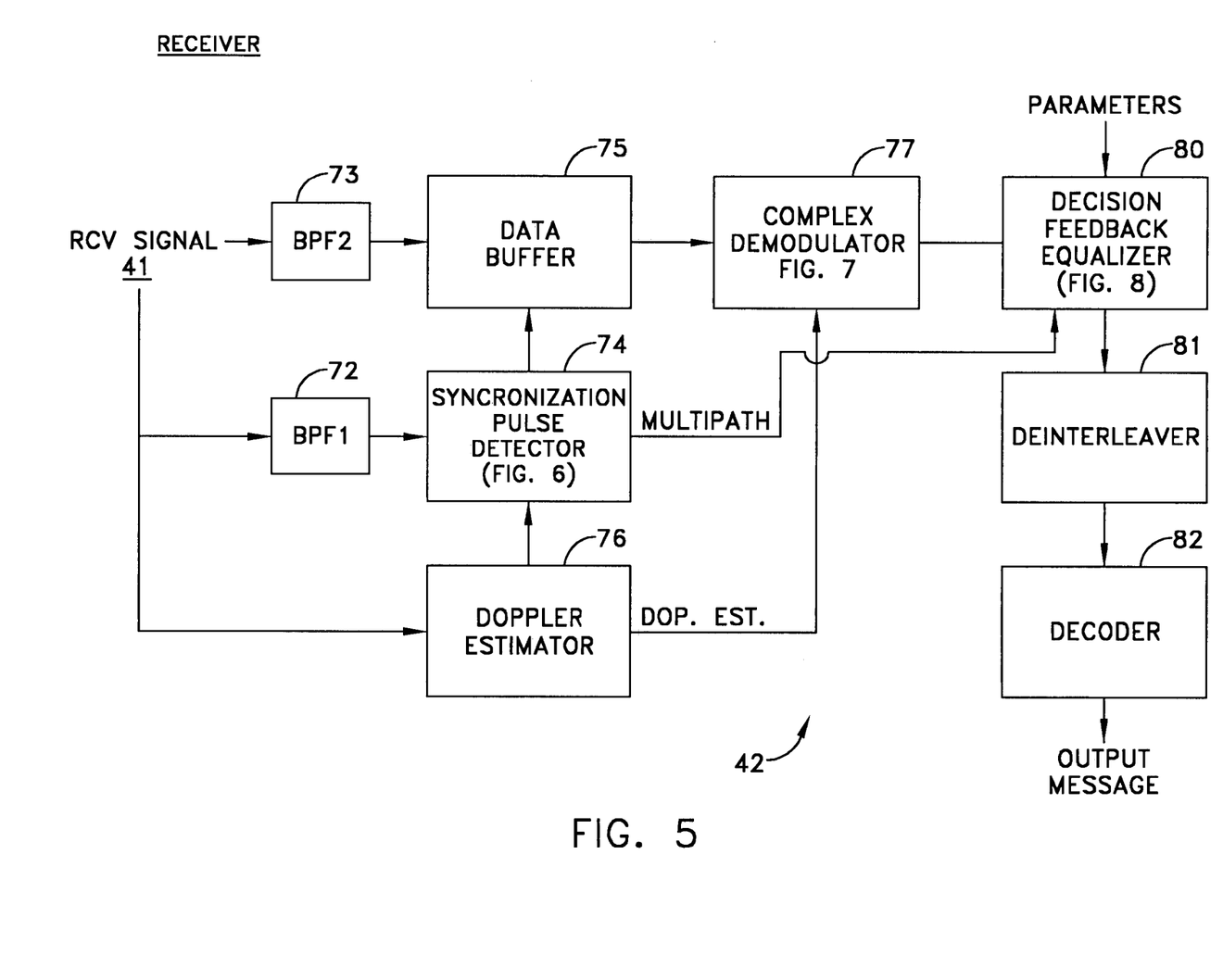
FIG. 5 is a block diagram of a receiver module useful in this invention.

Referring now to FIG. 5, the incoming received acoustic signal, such as the signal 40 in FIG. 2 is converted from its analog form in the A/D converter 41 to a digital form compatible with the process of the receiver module 42 process. More specifically the receiver module 42 includes a first band pass filter (BPF1) 72 and a second band pass filter 73 (BPF2). The BPF1 filter 72 provides an input to a synchronization pulse detector 74 while the BPF2 filter 73 provides the input to a data buffer 75. The received signal is also applied to a Doppler estimator 76 that provides an input to the synchronization pulse detector 74 and to a complex demodulator 77. The output from the demodulator 77 drives an adaptive decision feedback equalizer 80 in response to various parameters and to a multipath signal from the synchronization pulse detector 74. In turn, the output from the adaptive decision feedback equalizer drives a deinterleaver 81 and a decoder 82 to produce an output from which the data signals, such as the signals 54(0) and 54(1) are recovered when the transmitted signal incorporates these functions.

Figure 6:
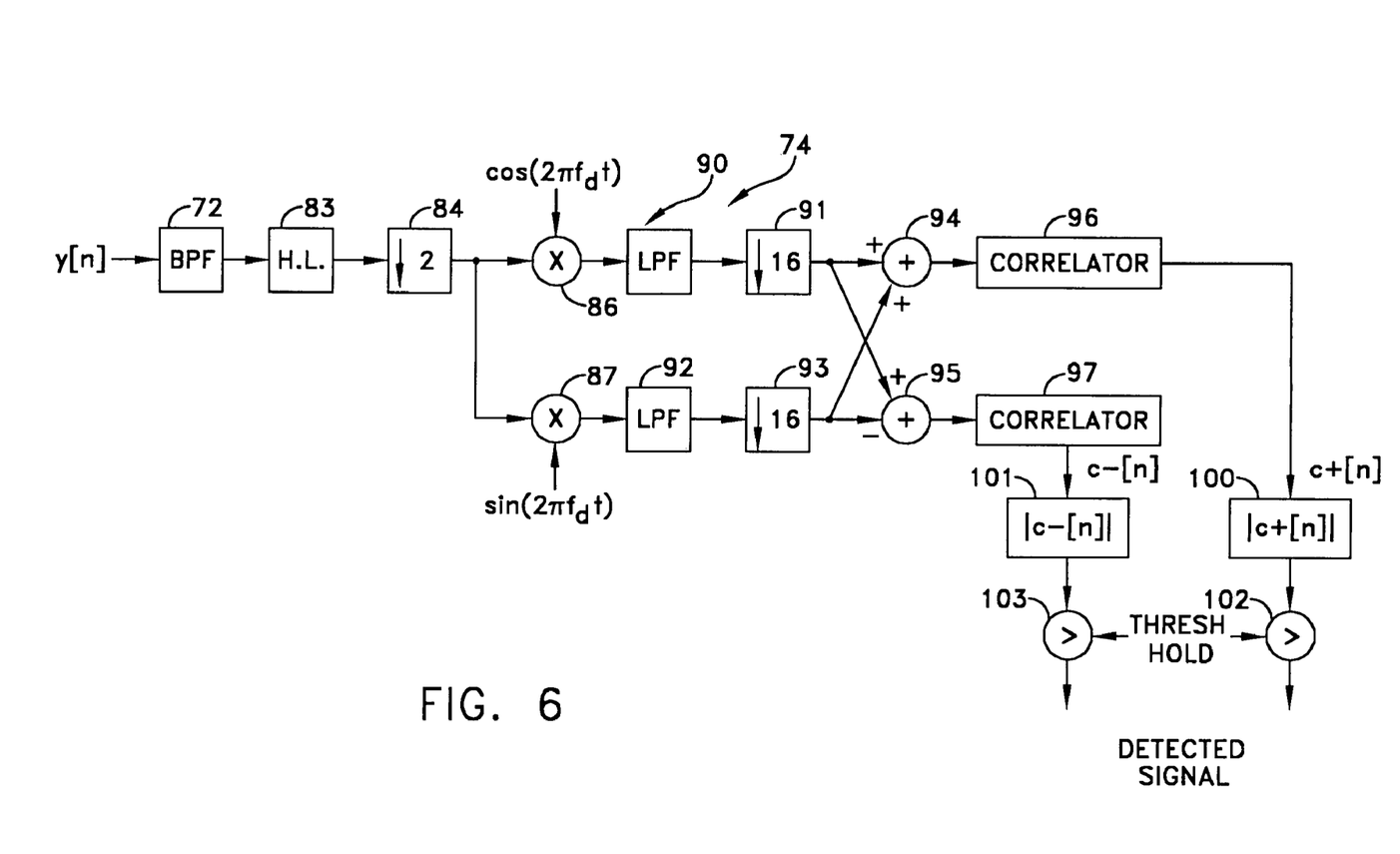
FIG. 6 is a more detailed schematic of a synchronization pulse detector that is adapted for use in the receiver of FIG. 5.

In order to properly decode the incoming signal, the detection of the synchronizing signal must be generated from the first threshold crossing at the synchronization pulse detector 74. FIG. 6 depicts a synchronization pulse detector 74 constructed as a clipped correlator. In this case the received input y[n] passes through the BPF1 band pass filter 72 into the correlator 74. A limit circuit 83 provides gain control and a divider 84 provides an appropriate sampling of the incoming signal.

The incoming signal is then demodulated in the complex demodulator 77 with the sine and cosine functions with a demodulating frequency that is twice the Doppler shifted frequency. This demodulator is represented as two demodulators 86 and 87 that operate at a frequency $f_d$. A low pass filter 90 and a "divide-by-16" circuit 91 process the output from the demodulator 86. A low pass filter 92 and "divide-by-16" circuit 93 process the output from the demodulator 87. The outputs from the circuits 91 and 93 drive summing circuits 94 and 95 that connect to correlators 96 and 97, respectively. Absolute values are then obtained from each correlator in circuits 100 and 101 before being coupled through threshold detectors 102 and 103.

The threshold circuits 102 and 103 provide a detect signal for the decision feed back equalizer 80 to preserve time diversity pairing of the data packets. Specifically, two synchronization pulses are used for data transmission, one from each packet. The complex demodulator 77 does not accept a detection flag from the synchronization pulse detector 74 unless both synchronizations are present. The complex demodulator also blocks any further signals if the synchronization detectors do not produce the synchronization pulses at the appropriate repetition rate. This minimizes the potential for missed packet detections and false alarms.

As previously indicated, at step 71 in FIG. 4 the transmitter module superimposes a CW Doppler tracking signal on the QPSK signal. This tone can be started prior to the initiation of the data stream. In one specific example the CW tone starts one second before the first packet begins transmission and remains on continuously throughout the duration of the transmission. Thus, the CPU 34, transmitter module 35, D/A converter 36 and transducer 24 transmit, as an output signal, a modulated signal in a given frequency band and a continuous pilot signal having a frequency closely adjacent the given frequency band.

The Doppler estimator 76 in FIG. 5 receives this Doppler tracking tone, or pilot signal, and constantly samples this tone to estimate the Doppler shift of the incoming QPSK data packet. A narrow band pass filter centered at the frequency of the CW pilot tone samples the data. The bandwidth of the filter is set to pass the tone assuming frequent Doppler shifts in the frequencies shift range of ±1%. A decimator processes the output from the bandpass filter, and a multi-point Fast Fourier Transform (FFT) is then performed on the decimated data to provide an accurate Doppler estimate. Using a decimating factor of 48 to 56 and a 512 point FFT, for example, yields a Doppler resolution of less than 0.02%.

As shown in FIG. 5, the output of the Doppler estimator is transferred to the synchronization pulse detector 74 and to the complex demodulator 77. The synchronization pulse detector 74 uses the information to tune the frequency of its space banding routine. When a synchronization detection occurs, the receiver 42 buffers the incoming data packet in the data buffer 75. The first Doppler estimate received after packet detection occurs is assigned to the Doppler estimate of the buffered packet. With the next packet detection, the presently buffered data and its estimated Doppler shifted center frequency are passed to the complex demodulator 77.

Figure 7:
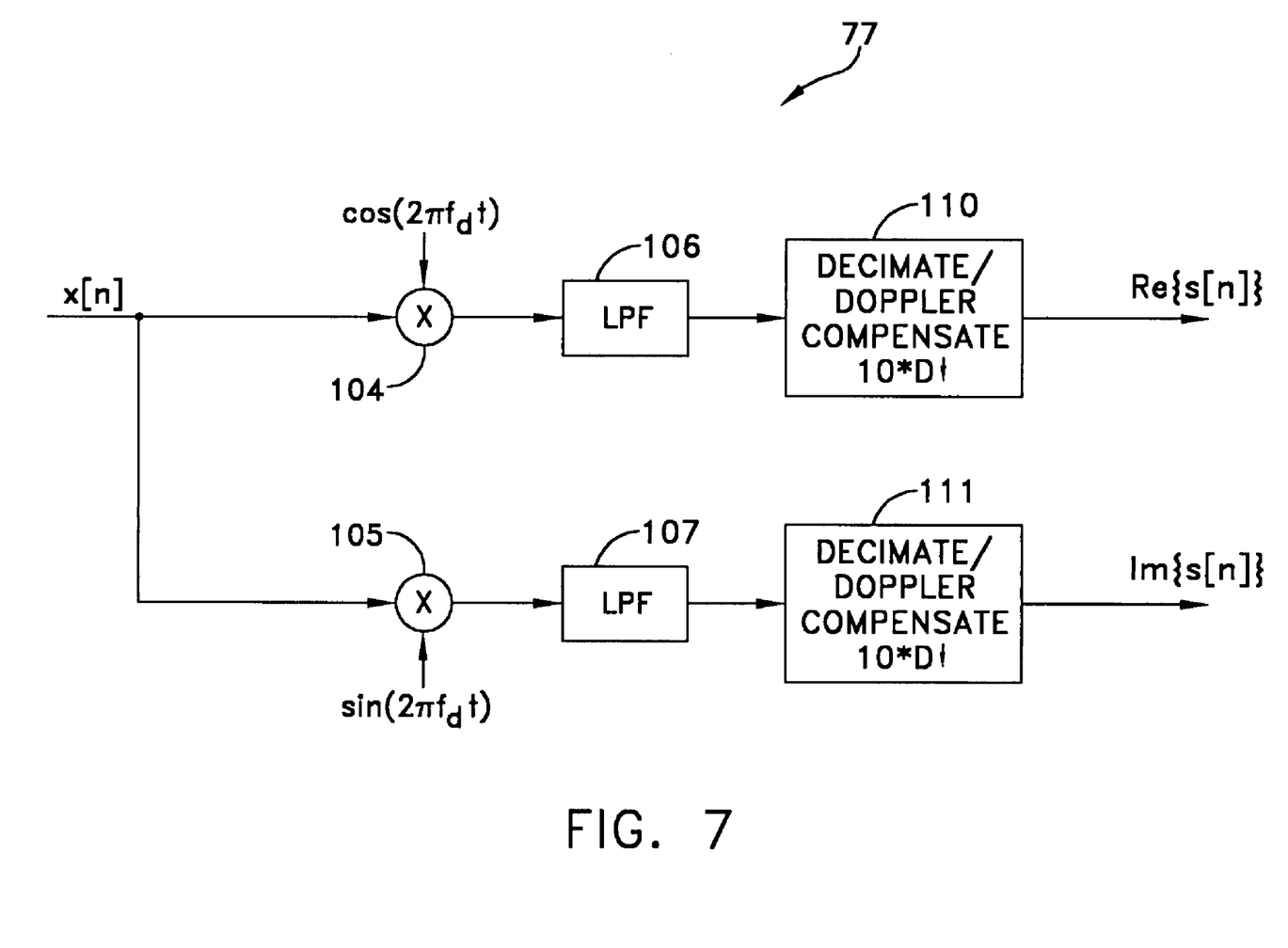
FIG. 7 is a more detailed schematic of a complex demodulator that is adapted for use in the receiver of FIG. 5.

The complex demodulator 77 in FIG. 5 receives the Doppler shifted center frequency signal from the estimator 76 and decodes the information in the data buffer 75. FIG. 7 is a diagram of this complex demodulator. It shows two input signals. Specifically, a signal x[n] represents the data taken at a nominal sampling rate and a signal $f_d$ is the Doppler compensated bandwidth frequency. Demodulators 104 and 105 receive these signals.

The advantage of using the Doppler compensated continuous wave tone as a demodulating signal becomes apparent in terms of analyzing a specific signal. Assume that the transmitted signal has a bit duration of 400 microseconds with a nominal bandwidth of 2500 Hz. If the Doppler shift is ±0.1%, the Doppler shifted signal has a bandwidth of 2502.5 Hz and its duration is 0.999 $t_0$. Assume further that both the original signal and the Doppler shifted signal are sampled at a Nyquist rate of 5 kHz, so $t_0$ equal 800 milliseconds. All the power and information in the original analog signal is contained within 4000 samples. However, all the information in the Doppler shifted signal is contained in only 3,996 samples. Now it will become apparent that once a signal has been sampled, the time axis assigned to the samples is arbitrary. If the clock of the A/D converter 42 in FIG. 2 were adjusted such that the Doppler shifted signal were sampled at 5,005 Hz, there would be 4,000 samples within the time interval $t_d$. In the absence of noise, these 4,000 samples would be identical to the 4,000 samples form the original signal sampled at 5 KHz.

Referring again to FIG. 7, low pass filters 106 and 107 pass the signals from the demodulators 104 and 105 to Doppler compensation circuits 110 and 111, respectively to produce signals Re{s[n]} and Im{s[n]} representing the real and imaginary components of the complex vector signal x[n].

This circuitry approximates the previously described methodology but uses a fixed sampling rate. In this case, the sampling rate is set to 50 KHz so that the original signal has 40,000 samples. For the above-identified Doppler shift, the Doppler shifted signal contains only 39,960 samples. If the original signal were then decimated by 10, the resulting sequence would again contain 4,000 samples with two samples per QPSK symbol to create 4,000 samples in the Doppler shifted sample, the signal would have to be decimated by 10/d=9.99. The compensators 110 and 111 do not decimate by an integer value. Instead they find the most evenly spaced 4,000 samples within the 39960 samples. No interpolation between samples occurs. For example, the fifth entry in the decimated Doppler shifted sequence should have an index in the over sampled sequence of five times 9.999 or 49.95. No such sample exists. The fiftieth sample in the oversampled sequence would be used. For the 57th decimated sample, 57×9.99 equals 569.4 so sample 569 would be used. This process assumes that the difference between the closest sample in the oversampled sequence and the actual value at the fractional index is small and that the closest sample is a good approximation of the actual value. However, this assumption is only valid when the original fixed sampling rate is much greater than the desired decimated rate. Oversampling by a factor of 10 appears sufficient, but obviously other oversampling factors might be used.

Figure 8:
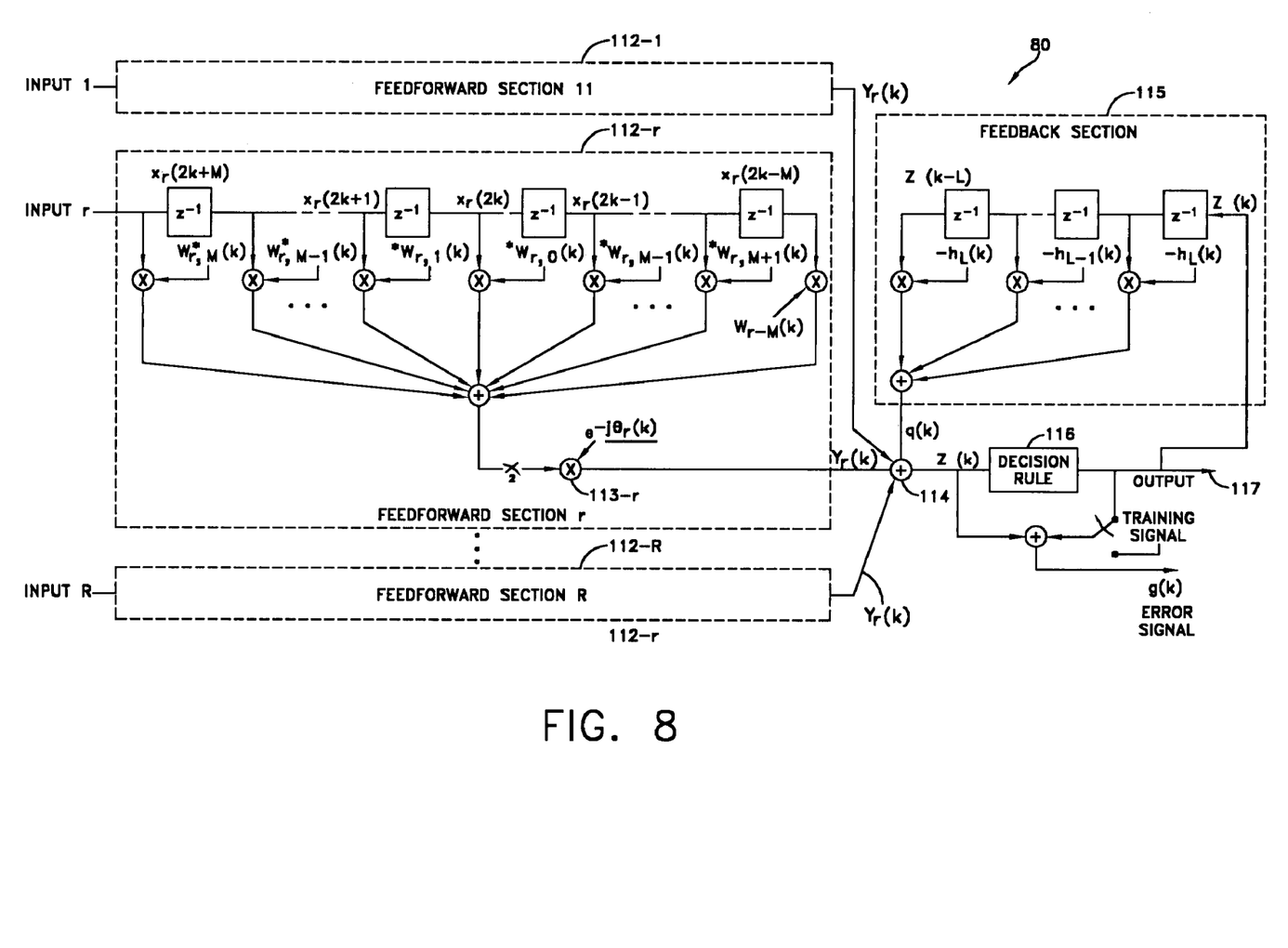
FIG. 8 is a more detailed schematic of a decision feedback equalizer that is adapted for use in the receiver of FIG. 5.

FIG. 8 depicts the adaptive decision feedback equalizer in greater detail. It contains a plurality of feedforward sections shown as feedforward sections 112-1, 112-r and 112-R. Such feedforward sections are known in the art and receive an input to be summed and processed through a number of circuits to produce a phase compensated output at a modulating junction 113-r.

A summing junction 114 receives all these input signals along with a feedback signal from a feedback section 115. A decision rule circuit 116 provides an output signal (os symbol sequence) 117 that is conveyed to the de-interleaver circuit 81 in FIG. 4.

Such an adaptive equalizer forms an effective receiver component because it has the ability to reduce severe time varying intersymbol interference. The feedforward sections 112 use fractional spacing to compensate for any packet synchronization misalignments as well as delay and amplitude distortion. Diversity inputs are included to offset the significant performance degradation that can occur in a single input receiver due to fading. The digital phase locked loop section that includes the feedback section 115 provides adaptive carrier phase recovery and maintains receiver performance in the underwater acoustic environment where rapid phase shifts can introduce errors. The phase shifts are often too rapid to be tracked by only adapting filter coefficients that are required in other circuits. Without implicit phase correction, where $\theta_r(k)$ is the phase estimate for the rth channel, the decision feedback equalizer would fail in most underwater applications.

More specifically, the estimate of the received symbol can be written as:

$$Z(k)=W^h(k)U(k) \tag{1}$$

$$W(k)=[w_{1,n}(k) \ldots w_{i,-M}(k) \ldots W_{R,M}(k) \ldots \\ W_{R,-M}(k)h_1(k) \ldots h_L(k)]^T \tag{2}$$

$$U(k)=[x1(2\ k+M)e^{-j\theta_1(k)} \ldots x_1(2\ k+M)e^{-j\theta_1(k)} \ldots \\ x_1(2\ k-M)e^{-j\theta_1(k)} \ldots x_R(2\ k+M)e^{-j1(k)} \ldots \\ x_R(2\ k+M)e^{-j\theta_1(k)}Z(k-1) \ldots Z(k-L)]^T \tag{3}$$

Adaptive decision feedback equalizers for processing signals in accordance with equations (1) through (3) are well within the skill of a person of ordinary skill in the art. In some applications a standard recursive least squares algorithm adjusts the weight factor W(k) with input U(k) to produce minimum mean-square error in the symbol estimate Z(k). However, standard RLS algorithms introduce complexities and make it undesirable for this particular application. Consequently FIG. 8 depicts a structure in which fast transversal filter (FTF) algorithms provide an implementation of the RLS update equations to reduce the computational burden. FTF algorithms offer convergence and tracking performance without the computational load of conventional RLS algorithms.

Referring again to FIG. 5, the output signal 117 from the adaptive decision feedback equalizer 80 is a synchronized demodulated signal based upon the received pilot signal and the modulated signal from the received signal. The receiver 42 transfers this equalizer output to a de-interleaver circuit 81 that is a first component in the decoding process for generating the received message at the terminal 26. The de-interleaver circuit 81 performs the reverse function performed by the interleaver 63 in FIG. 4. If data is encoded using for example a convolutional code, a decoder 82 converts the signal from the de-interleaver 81 to a decoded output message. The specific implementation of the decoder 82 will be dependent upon the specific implementation of the encoder 62.

As will now be apparent, a system constructed in accordance with this invention meets several objectives of this invention. Specifically, a communications system constructed in accordance with this invention provides an acoustic bi-directional undersea communication system. The system overcomes or minimizes many of the problems introduced by multi-path effects. As a result, the system provides high telemetry rates and provides reliable communications in both deep water and shallow water environments.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A communications system that includes at least two transceivers for transmitting and receiving data wherein each transceiver comprises:
   a transmitting acoustic transducer for transmitting a plurality of acoustic output signals;
   a receiving acoustic transducer for receiving a plurality of acoustic input signals;
   a digital to analog signal converter joined to said transmitting acoustic transducer to provide a plurality of analog output signals for conversion into said plurality of acoustic output signals for transmission;

an analog to digital signal converter joined to said receiving acoustic transducer to receive the plurality of acoustic input signals and convert them into a plurality of digital input signals;

a transmitter module joined to said digital to analog signal converter to provide a plurality of digital output signals to be converted to said plurality of analog output signals, wherein said transmitter module comprises:

a means for encoding user entered data as part of a plurality of data packets of a fixed length having a leading synchronization field;

a means for modulating a signal containing said plurality of data packets;

a means for transmitting said modulated signal in a predetermined frequency band; and a means for transmitting simultaneously with said modulated signal a continuous wave pilot signal having a frequency adjacent said predetermined frequency band a receiver module joined to said analog to digital signal converter to receive said converted plurality of digital input signals, wherein said receiver module comprises:

a means for receiving the continuous wave pilot signal and the modulated signal;

a means for detecting the presence of the synchronization field in said plurality of data packets;

a means for demodulating the modulated signal;

a means for cross correlating the received continuous wave pilot signal and modulated signal to produce a cross correlated demodulated signal; and a means for decoding the cross correlated demodulated signal to produce the user entered data;

and a user interface joined to said receiver module and said transmitter module to allow a user to enter data to be transmitted as said plurality of acoustic output signals and to allow a user to view data that has been received as said plurality of acoustic input signals.

2. A system as recited in claim 1 wherein:

said transmitter module further comprises an interleaver for deterministically scrambling the plurality of data packets prior to modulation of the signal; and said receiver module further comprises a de-interleaver for deterministically unscrambling the plurality of data packets prior to decoding the cross correlated demodulated signal.

3. A system as recited in claim 2 wherein said transmitter module further comprises a convolutional encoder for encoding the user entered data in the plurality of data packets prior to modulation of the signal.

4. A system as recited in claim 3 wherein said means for decoding the cross correlated demodulated signal to produce the original transmitted user entered data comprises a convolutional decoder.

5. A system as recited in claim 4 wherein said receiver module further comprises a Doppler estimator for generating signals representing any Doppler distortion in the plurality of acoustic input signals received by the receiving acoustic transducer.

6. A system as recited in claim 5 wherein said means for demodulating the modulated signal comprises a complex demodulator that receives the modulated signals and a Doppler compensation signal from the Doppler estimator for demodulating the modulated signal.

7. A system as recited in claim 6 wherein said means for cross correlating the received pilot signal and modulated signal to produce a cross correlated demodulated signal comprises an adaptive equalizing means for reducing interference in the modulated signal.

8. A system as recited in claim 7 wherein said a means for detecting the presence of the synchronization field in said plurality of data packets comprises a synchronization pulse detector.

9. A system as recited in claim 1 wherein said digital to analog signal converter converts the plurality of data packets to be transmitted over said system in digital form to an analog signal for use by the transmitting acoustic transducer.

10. A system as recited in claim 1 wherein said analog to digital converter converts the plurality of acoustic input signals received by said receiving acoustic transducer in analog form into digital form for processing by said receiver module.

* * * * *